(12) United States Patent
Hewitt

(10) Patent No.: US 6,862,647 B1
(45) Date of Patent: Mar. 1, 2005

(54) SYSTEM AND METHOD FOR ANALYZING BUS TRANSACTIONS

(75) Inventor: Larry D. Hewitt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 403 days.

(21) Appl. No.: 10/059,691

(22) Filed: Jan. 29, 2002

(51) Int. Cl.[7] ............................................... G06F 1/00
(52) U.S. Cl. .................. 710/313; 710/305; 710/311; 710/306; 710/314; 710/31; 710/38
(58) Field of Search ........................... 710/305–317, 710/20–27, 31–34, 36–42, 8–19, 300, 104–106, 110–113; 709/208–209

(56) References Cited

U.S. PATENT DOCUMENTS

| | | | |
|---|---|---|---|
| 5,749,095 A | * | 5/1998 | Hagersten .................. 711/141 |
| 5,751,951 A | * | 5/1998 | Osborne et al. ............ 709/250 |
| 5,809,328 A | * | 9/1998 | Nogales et al. ................ 710/5 |
| 5,864,738 A | * | 1/1999 | Kessler et al. .............. 709/223 |
| 5,884,053 A | * | 3/1999 | Clouser et al. ............. 710/306 |
| 6,085,274 A | * | 7/2000 | Seeman ....................... 710/310 |
| 6,115,551 A | * | 9/2000 | Chao ............................ 710/72 |
| 6,247,058 B1 | * | 6/2001 | Miller et al. ................ 709/234 |
| 6,256,740 B1 | * | 7/2001 | Muller et al. ............... 713/201 |
| 6,300,787 B1 | | 10/2001 | Shaeffer et al. |
| 6,327,676 B1 | | 12/2001 | Abramov et al. |
| 6,381,269 B1 | | 4/2002 | Gradl et al. |
| 6,414,525 B2 | * | 7/2002 | Urakawa ..................... 327/112 |
| 6,484,215 B1 | * | 11/2002 | Gibart et al. .................. 710/9 |
| 6,539,439 B1 | * | 3/2003 | Nguyen et al. ............... 710/52 |
| 6,546,448 B1 | * | 4/2003 | Lai et al. .................... 710/310 |
| 6,557,048 B1 | * | 4/2003 | Keller et al. ................... 710/6 |
| 6,691,185 B2 | * | 2/2004 | Avery .......................... 710/52 |
| 6,697,890 B1 | * | 2/2004 | Gulick et al. ................. 710/62 |
| 6,728,822 B1 | * | 4/2004 | Sugawara et al. .......... 710/311 |

* cited by examiner

*Primary Examiner*—Paul R. Myers
*Assistant Examiner*—Raymond N Phan
(74) *Attorney, Agent, or Firm*—Meyertons Hood Kivlin Kowert & Goetzel, P.C.; B. Noël Kivlin; Erik A. Heter

(57) ABSTRACT

A system and method for observing transactions on a packet bus is disclosed. In one embodiment, a computer system includes a plurality of input/output (I/O) nodes serially coupled to a processor. Each of the I/O nodes may be configured to operate in a first (normal) mode, and a second (analysis) mode. During the normal mode, packets may be selectively conveyed through an I/O tunnel in the I/O node, and particular packets may be selectively conveyed to a peripheral bus interface in the I/O node. In the analysis mode, electrical signals corresponding to packets conveyed through the I/O tunnel may be replicated on a peripheral bus coupled to the peripheral bus interface. No conversion from the packet bus protocol to the peripheral bus protocol. A signal analyzer may be coupled to the peripheral bus, thereby allowing observation of the electrical signals.

47 Claims, 5 Drawing Sheets

SYSTEM AND METHOD FOR ANALYZING BUS TRANSACTIONS

BACKGROUND OF THE INVENTION

1. Field of the Invention

This invention relates to computer system input/output (I/O), and more particularly, to observing transactions occurring on a bus for debug purposes.

2. Description of the Related Art

In a typical computer system, one or more processors may communicate with input/output (I/O) devices over one or more buses. The I/O devices may be coupled to the processors through an I/O bridge which manages the transfer of information between a peripheral bus connected to the I/O devices and a shared bus connected to the processors. Additionally, the I/O bridge may manage the transfer of information between a system memory and the I/O devices or the system memory and the processors.

Unfortunately, many bus systems suffer from several drawbacks. For example, multiple devices attached to a bus may present a relatively large electrical capacitance to devices driving signals on the bus. In addition, the multiple attach points on a shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced. An example of a shared bus used by I/O devices is a peripheral component interconnect (PCI) bus.

Many I/O bridging devices use a buffering mechanism to buffer a number of pending transactions from the PCI bus to a final destination bus. However buffering may introduce stalls on the PCI bus. Stalls may be caused when a series of transactions are buffered in a queue and awaiting transmission to a destination bus and a stall occurs on the destination bus, which stops forward progress. Then a transaction that will allow those waiting transactions to complete arrives at the queue and is stored behind the other transactions. To break the stall, the transactions in the queue must somehow be reordered to allow the newly arrived transaction to be transmitted ahead of the pending transactions. Thus, to prevent scenarios such as this, the PCI bus specification prescribes a set of reordering rules that govern the handling and ordering of PCI bus transactions.

To overcome some of the drawbacks of a shared bus, some computers systems may use packet-based communications between devices or nodes. In such systems, nodes may communicate with each other by exchanging packets of information. In general, a "node" is a device which is capable of participating in transactions upon an interconnect. For example, the interconnect may be packet-based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. A node located on a communication path between the source and target nodes may relay or forward the packet from the source node to the target node.

Additionally, there are systems that use a combination of packet-based communications and bus-based communications. For example, a system may connect to a PCI bus and a graphics bus such as AGP. The PCI bus may be connected to a packet bus interface that may then translate PCI bus transactions into packet transactions for transmission on a packet bus. Likewise the graphics bus may be connected to an AGP interface that may translate AGP transactions into packet transactions. Each interface may communicate with a host bridge associated with one of the processors or in some cases to another peripheral device.

When PCI devices initiate the transactions, the packet-based transactions may be constrained by the same ordering rules as set forth in the PCI Local Bus specification. The same may be true for packet transactions destined for the PCI bus. These ordering rules are still observed in the packet-based transactions since transaction stalls that may occur at a packet bus interface may cause a deadlock at that packet bus interface. This deadlock may cause further stalls back into the packet bus fabric. In addition, AGP transactions may follow a set of transaction ordering rules to ensure proper delivery of data.

Depending on the configuration of the I/O nodes, transactions may be forwarded through a node to another node either in a direction to the host bridge or away from the host bridge. Alternatively, transactions may be injected into packet traffic at a particular node.

One of the disadvantages of some packet-based communications is the lack of ability to observe transactions that occur on the packet bus. Often times during the design phase of a computer system board, it is necessary to perform testing and debugging to ensure compatibility with various peripheral devices. Similarly, when designing a new peripheral device, it is often necessary to perform testing an debugging to ensure its compatibility with the host computer system(s) for which it is being designed. Furthermore, the inability to monitor transactions on some packet bus architectures may hinder efforts of to isolate and repair a fault in an operational computer system employing the packet bus. Thus, if a fault occurs on the packet bus itself, or one of the I/O nodes coupled to the packet bus, it may not be possible to isolate.

SUMMARY OF THE INVENTION

A system and method for observing transactions on a packet bus is disclosed. In one embodiment, a computer system includes a plurality of input/output (I/O) nodes serially coupled to a processor. Each of the I/O nodes may be configured to operate in a first (normal) mode, and a second (analysis) mode. During the normal mode, packets may be selectively conveyed through an I/O tunnel in the I/O node, and particular packets may be selectively conveyed to a peripheral bus interface in the I/O node. In the analysis mode, electrical signals corresponding to packets conveyed through the I/O tunnel may be replicated on a peripheral bus coupled to the peripheral bus interface. No conversion from the packet bus protocol to the peripheral bus protocol is required in order for the electrical signals to be replicated onto the packet bus. A signal analyzer ma) be coupled to the peripheral bus, thereby allowing observation of the electrical signals.

In one embodiment, a dummy card may be inserted into a connector on the peripheral bus. A signal analyzer or logic analyzer may then be coupled to the dummy card. Electrical signals corresponding to packets conveyed on the packet bus may then be observed using the signal/logic analyzer. In another embodiment, a signal/logic analyzer card (i.e. computer based instrumentation) may be inserted directly into the connector in order to allow the observation of electrical signals corresponding to conveyed packets.

In various embodiments, the I/O node may include a command register configured to store one or more bits indicative of the mode in which the I/O node is currently operating. In one embodiment, the I/O node may be placed into the analysis mode by latching the state of one or more input signals into the register from the peripheral bus. The one or more input signals may correspond to the one or more bits stored in the register for indicating the current mode of operation. The latching may be performed during a power-on reset of the I/O node, with the signals being driven to the command register via the peripheral bus. The analysis mode may be exited by performing another power-on reset without latching the appropriate signal states to the command register. Other embodiments are possible and contemplated wherein other means are used to enter and exit the analysis mode, and the signals for entering the analysis mode may be conveyed from buses other than the peripheral bus. Furthermore, embodiments are possible and contemplated wherein a power-on reset is not required to enter or exit the analysis mode.

Some embodiments of the I/O node may also include an arbitration unit. The arbitration unit may determine the order in which electrical signals corresponding to a given packet appear on the peripheral bus relative to electrical signals corresponding to other packets which are also to appear on the peripheral bus. In some cases, two or more packets may pass through the I/O node simultaneously. In such situations, the arbitration unit may determine which of the packets will be replicated onto the peripheral bus first. This may allow for all packets conveyed through the I/O node to be observed even when the peripheral bus bandwidth is less than the bandwidth of the packet bus.

In various embodiments, the peripheral bus may be a peripheral component interconnect (PCI) bus, a general-purpose instrument bus (GPIB), an advanced graphics port (AGP) bus, or any other type of peripheral bus.

As previously noted, the transactions replicated from the packet bus need not match the protocol of the peripheral bus in order to observe them. In addition to replicating electrical signals from packets conveyed on the packet bus, the I/O node may also provide an indication as to whether a particular packet is being conveyed upstream (towards a host processor) or downstream (away from a host processor).

Because the system and method may utilize the I/O node and an existing peripheral bus connector, no additional hardware or alteration to the system board is needed in order for implementation. The ability to monitor packets conveyed on the packet bus may aid in debugging errors occurring between a host processor and a peripheral device. Fault isolation may be further aided by the ability to determine whether a particular packet is being conveyed upstream or downstream.

BRIEF DESCRIPTION OF THE DRAWINGS

Other aspects of the invention will become apparent upon reading the following detailed description and upon reference to the accompanying drawings in which.

Figure 1:
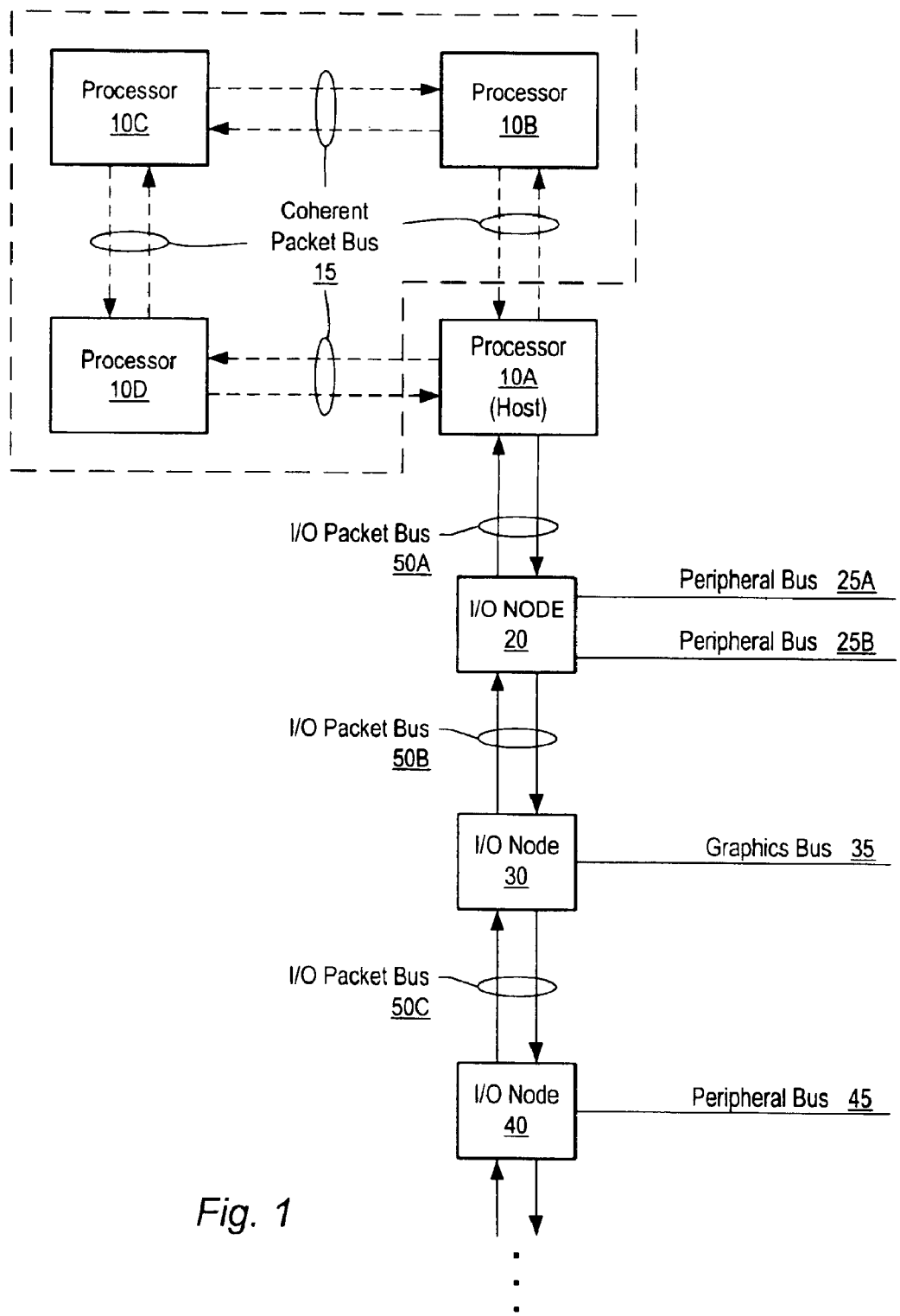
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a computer system is shown. The computer system includes processors 10A–10D each interconnected by a coherent packet bus including links 15A–D. Each link of coherent packet bus 15 may form a high-speed point-to-point link. The computer system also includes three I/O nodes numbered 20, 30 and 40 each connected together in a chain by non-coherent (NC) packet bus links 50B and 50C respectively. NC packet bus link 50A is coupled between host node/processor 10A and I/O node 20. Processor 10A is illustrated as a host node and may include a host bridge for communicating with I/O node 20 via NC packet bus link 50A. Processors 10B–D may also include host bridges for communication with other I/O nodes (not shown). The NC packet bus links formed by NC packet bus 50A–C may also be referred to as a point-to-point links. I/O node 20 is connected to a pair of peripheral buses 25A–B. I/O node 30 is connected to a graphics bus 35, while I/O node 40 is connected to an additional peripheral bus 45. It is noted that in other embodiments, other numbers of processors may be used.

In the present embodiment, each link of coherent packet bus 15 is implemented as sets of unidirectional lines (e.g. lines 15A are used to transmit packets from processor 10A to processor 10B and lines 15B are used to transmit packets from processor 10B to processor 10C). Other sets of lines 15C–D are used to transmit packets between other processors as illustrated in FIG. 1. The coherent packet bus 15 may be operated in a cache coherent fashion for communication between processing nodes ("the coherent link"). Further, non-coherent packet bus 50 may be operated in a non-coherent fashion for communication between I/O nodes and between I/O nodes and a host bridge such as the host bridge of processor 10A ("the non-coherent link"). The interconnection of two or more nodes via coherent links may be referred to as a "coherent fabric". Similarly, the interconnection of two or more nodes via non-coherent links may be referred to as a "non-coherent fabric". It is noted that a packet to be transmitted from one processor to another may pass through one or more intermediate nodes. For example, a packet transmitted by processor 10A to processor 10C may pass through either processor 10B or processor 10D as shown in FIG. 1. Any suitable routing algorithm may be used.

Processors 10A–10D are each illustrative of, for example, an x86 microprocessor such as an Athlon™ microprocessor. In addition, one example of a packet bus such as non-coherent packet bus 50 may be compatible with HyperTransport™ technology. Peripheral buses 25A, 25B and 45 are illustrative of a common peripheral bus such as a peripheral component interconnect (PCI, or PCIX, an extended version of PCI) bus and graphics bus 35 is illustrative of an accelerated graphics port (AGP) interconnect, for example. It is understood, however, that other types of processors may be used, as well as other types of buses, including a general-purpose instrument bus (GPID3), industry standard architecture/extended industry standard architecture (ISA/ EISA) buses, and so forth.

It is noted that while three I/O nodes are shown connected to host processor 10A, other embodiments may have other numbers of I/O nodes and these I/O nodes may be connected in other topologies. The chain topology illustrated in FIG. 1 is shown for its ease of understanding. Furthermore, it should also be noted that separate processors may be connected to each end of the chain of I/O nodes (e.g. in one embodiment, a separate processor may be coupled to 110 node 40).

In the illustrated embodiment, the host bridge of processor 10A may receive upstream packet transactions from downstream nodes such as 110 node 20, 30 or 40. Alternatively, the host bridge of processor 10A may transmit packets downstream to devices such as peripheral devices (not shown) that may be connected to peripheral bus 25A for example. It should be noted that the terms "upstream" and "downstream" are relative to a given processor. As discussed above, some embodiments may include separate processors at each end of a chain of I/O nodes. Thus, packet traffic flow that is upstream relative to a processor at one end of the chain may be considered downstream relative to a processor at the other end of the chain. For example, if a processor is coupled to I/O node 40, packet traffic flow downstream relative to processor 10A (coupled to I/O node 20) is upstream relative to the other processor. Similarly, packet traffic flow that is upstream relative to processor 10A is downstream relative to the other processor.

Generally speaking, a packet is a communication between two nodes (an initiating node which transmits the packet and a destination node which receives the packet). The initiating node and the destination node may differ from the source and target node of the transaction of which the packet is a part, or either node may be either the source node or the target node. A control packet is a packet carrying control information regarding the transaction. Certain control packets specify that a data packet follows. The data packet carries data corresponding to the transaction and corresponding to the specifying control packet. In one embodiment, control packets may include command packets, info packets and response packets. It is noted that other embodiments are contemplated which include other types of packets.

As packets travel upstream or downstream on the non-coherent links or between coherent nodes on the coherent links, the packets may pass through one or more nodes. As used herein, "upstream" refers to packet traffic flow in the direction of the host bridge of processor 10A from an I/O node and "downstream" refers to packet traffic flow in the direction away from the host bridge of processor 10A to an I/O node. As will be described in greater detail below, to preserve the ordering rules of the various buses that may be connected to a given I/O node, the node may provide transaction reordering as well as packet buffering. Likewise, other nodes may include buffers for preventing commands from blocking each other due to logical conflicts between packets of a given type.

Generally speaking, a "virtual channel" is a communication path for carrying packets between various processors and I/O nodes. Each virtual channel is resource-independent of the other virtual channels (i.e. packets flowing in one virtual channel are generally not affected, in terms of physical transmission, by the presence or absence of packets in another virtual channel). Packets are assigned to a virtual channel based upon packet type. Packets in the same virtual channel may physically conflict with each other's transmission (i.e. packets in the same virtual channel may experience resource conflicts), but may not physically conflict with the transmission of packets in a different virtual channel.

Certain packets may logically conflict with other packets (i.e. for protocol reasons, coherency reasons, or other such reasons, one packet may logically conflict with another packet). If a first packet, for logical/protocol reasons, must arrive at its destination node before a second packet arrives at its destination node, it is possible that a computer system could deadlock if the second packet physically blocks the first packet's transmission (by occupying conflicting resources). By assigning the first and second packets to separate virtual channels, and by implementing the transmission medium within the computer system such that packets in separate virtual channels cannot block each other's transmission, deadlock-free operation may be achieved. It is noted that the packets from different virtual channels are transmitted over the same physical links. Thus, a separate receiving buffer for each virtual channel may be available prior to transmission. Thus, the virtual channels do not block each other even while using this shared resource.

In one embodiment, control packets include commands such as posted and non-posted writes, and non-posted reads. In addition, control packets include responses. Thus, to support operation as described above, the non-coherent packet interface may support three virtual channels corresponding to the three types of commands: non-posted, posted and response. It is noted however, that in other embodiments, other virtual channels are contemplated and may be used and supported.

During operation, I/O node 20 and 40 may translate PCI bus transactions into upstream packet transactions that travel in I/O streams and additionally may translate downstream packet transactions into PCI bus transactions. All packets originating at nodes other than the host bridge of processor 10A may flow upstream to the host bridge of processor 10A before being forwarded to any other node. All packets originating at the host bridge of processor 10A may flow downstream to other nodes such as I/O node 20, 30 or 40. Each I/O stream may be identified by an identifier called a Unit ID. It is contemplated that the Unit ID may be part of a packet header or it may be some other designated number of bits in a packet or packets. As used herein, "I/O stream" refers to all packet transactions that contain the same Unit ID and therefore originate from the same node.

To illustrate, a peripheral device on peripheral bus 45 initiates a transaction directed to a peripheral device on peripheral bus 25. The transaction may first be translated into one or more packets with a unique Unit ID and then transmitted upstream. It is noted that each packet may be encoded with specific information which identifies the packet. For example the Unit ID may be encoded into the packet header. Additionally, the type of transaction may also be encoded into the packet header. Each packet may be assigned a Unit ID that identifies the originating node. In the present embodiment, I/O node 20 may not forward packets to a peripheral device on peripheral bus 25 from downstream; the packets are first transmitted upstream to the host bridge of processor 10A. The host bridge of processor 10A may then transmit the packets back downstream with a Unit ID of the host bridge of processor 10A where I/O node 20 recognizes and claims the packet for the peripheral device on peripheral bus 25. I/O node 20 may then translate the packets into peripheral bus transactions and transmit the transactions to the peripheral device on peripheral bus 25. Further, transactions originating at the host bridge of processor 10A will also contain the Unit ID of the host bridge of processor 10A. However, as will be described further below, certain packets that are transmitted downstream will contain the Unit ID of the sending device.

As the packet transactions travel upstream or downstream, the packets may pass through one or more I/O nodes. The pass-through is sometimes referred to as a tunnel and the I/O node is sometimes referred to as a tunnel device. Packets that are sent from upstream to downstream or from downstream to upstream are referred to as "forwarded" traffic. Additionally, packet traffic that originates at a particular I/O node and is inserted into the upstream traffic is referred to as "injected" traffic.

To preserve the ordering rules of the various buses that may be corrected to an I/O node, the I/O node may provide transaction reordering as well as packet buffering. The I/O node may also include control logic which controls the flow of packets into and out of the tunnel by both forwarded and injected traffic.

Figure 2:
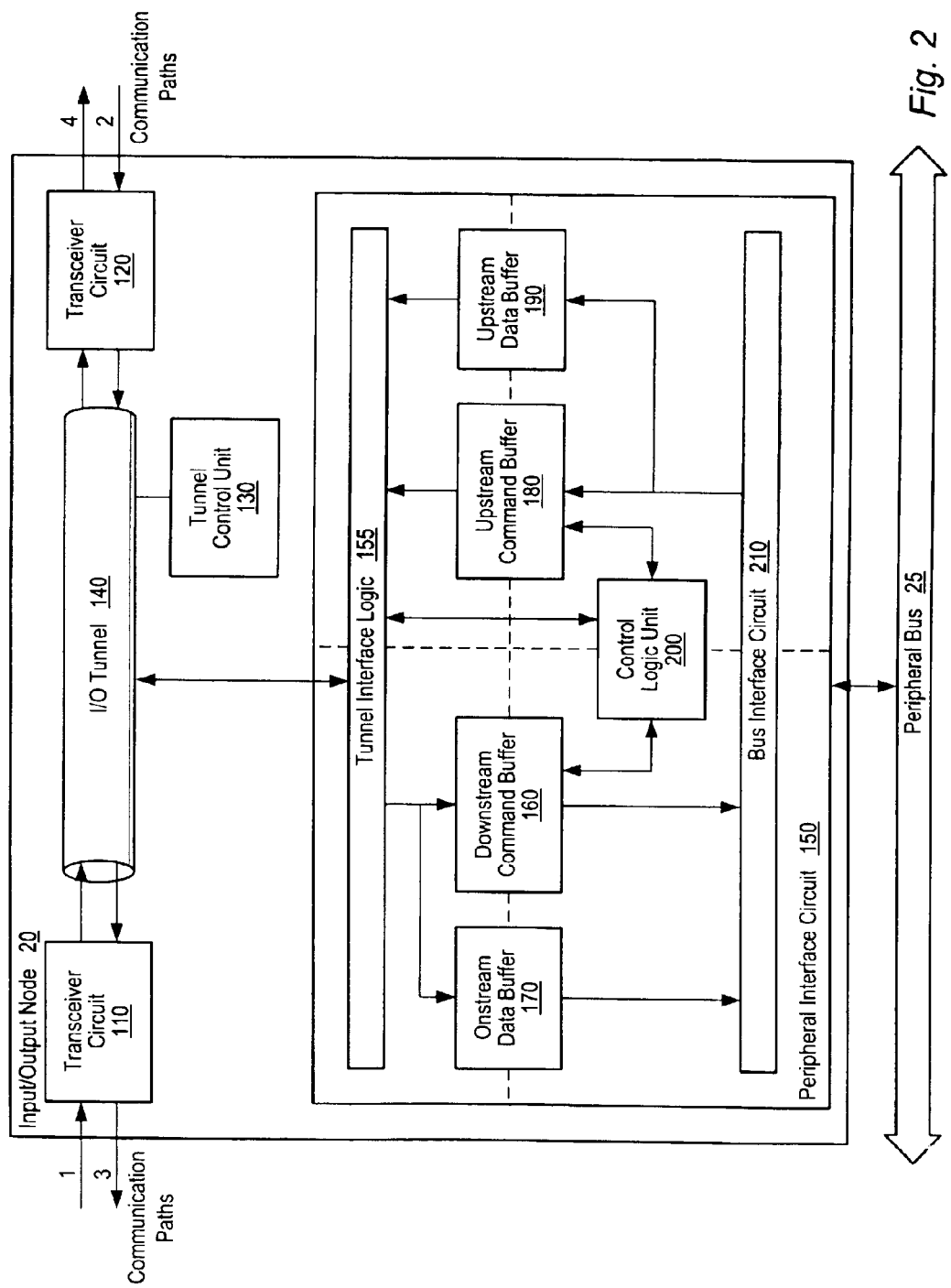
FIG. 2 is a block diagram of one embodiment of an I/O node.

Referring to FIG. 2, a block diagram of one embodiment of an input/output (I/O) node is shown. This particular description will refer to I/O node 20 for simplicity, but it should be noted that the description may apply as well to any of the I/O nodes shown in FIG. 1. Input/output node 20 includes an upstream packet bus interface and a downstream packet bus interface, implemented in this embodiment as transceiver circuit 110 and transceiver circuit 120, respectively. Transceiver circuits 110 and 120 are coupled together through an I/O tunnel 140. Transceiver circuits 110 and 120 may each include a transmitter and a receiver (not shown). The transmitters and receivers may be connected through I/O tunnel 140 such that the receiver of transceiver 110 may be coupled to the transmitter of transceiver 120 and the receiver of transceiver 120 may be coupled to the transmitter of transceiver 10. I/O tunnel 140 may include command and data buses used to forward packet traffic through I/O node 20. In addition, I/O node 20 includes a peripheral bus interface, implemented here as peripheral interface circuit 150. Peripheral interface circuit 150 is coupled to transceivers 110 and 120 through 110 tunnel 140. However as described above, transactions which originate at peripheral interface circuit 150 and then enter 110 tunnel 140 may be referred to as injected transactions. I/O node 20 also includes a tunnel control unit 130 which is coupled to control the transactions between transceivers 10 and 120 and peripheral interface 150. I/O node 20 is also coupled to a peripheral bus 25 through the peripheral interface circuit 150.

In the illustrated embodiment, transceivers 110 and 120 are part of two uni-directional communication paths through I/O tunnel 140. Since each of the communication paths is uni-directional, either path may be connected as the upstream or downstream path. Thus, the injected traffic from peripheral interface circuit 150 may be provided to either of transceivers 110 and 120. Transceivers 110 and 120 may each receive packet transactions into a receive buffer (not shown). As each transaction is received, a control command may be generated containing a subset of the information contained in the received command. The control command may include the Unit Id of the originating node, destination information, a data count and transaction type, for example. It is noted that the control command may include other information or may not include some of the information listed here. The control command may be sent from transceivers 110 and 120 to tunnel control unit 130. Tunnel control unit 130 may further determine which of the received transactions may be sent from a respective transceiver and to indicate to the transceiver to send the transaction to the transaction's destination.

In the illustrated embodiment, peripheral interface circuit 150 may be thought of as having a downstream section and an upstream section. The downstream section may handle downstream transactions whose destination may be a device connected to peripheral bus 25. Packets received by the downstream section may allow peripheral bus interface circuit to generate cycles on the peripheral bus, enabling communication with peripheral devices coupled to the bus. The upstream section may handle transactions which originate from devices that may be connected to peripheral bus 25. Thus, peripheral interface circuit 150 includes a downstream command buffer 160 and a downstream data buffer 170, each coupled to I/O tunnel 140 via tunnel interface logic 155. Downstream command buffer 160 and downstream data buffer 170 are each coupled to peripheral bus 25 via bus interface circuit 210. Peripheral interface circuit 150 also includes an upstream command buffer 160 and an upstream data buffer 190, each a coupled to I/O tunnel 140 via tunnel interface logic 155. Upstream command buffer 160 and upstream data buffer 170 are also each coupled to peripheral bus 25 via bus interface circuit 210. Peripheral interface circuit 150 further includes a control logic unit 200 which is coupled to both upstream command buffer 180 and downstream command buffer 160.

It is noted that in the illustrated embodiment, peripheral bus 25 is illustrative of a variety of common peripheral buses such as a PCI bus, a PCI-X bus and an AGP bus for example. Additionally, bus interface circuit 210 may include circuitry for translating peripheral bus commands from such buses. Further, it is contemplated that in one particular embodiment, bus interface circuit 210 may be a bus interface such as a Compaq™ Rapid Enabler for PCI-X (CREX) interface. Lastly, it is contemplated that in certain embodiments, I/O node 20 may include more than one peripheral interface circuit (not shown) and that I/O node may include arbitration logic (not shown) which may arbitrate between commands sent from each of the peripheral interface circuits.

Transactions may be sent from transceiver circuit 10 or 120 depending on which transceiver is connected as the downstream receiver. The command portion of the transaction may be stored in downstream command buffer 160 and the data portion of the transaction may be stored in downstream data buffer 170. Likewise, when a transaction is sent from bus interface circuit 210, the command portion of the transaction may be stored in upstream command buffer 180 and the data portion of the transaction may be stored in upstream data buffer 190. Control logic unit 200 may be configured to control the conveyance of the transactions to and from bus interface 210 and I/O tunnel 140.

In response to peripheral interface circuit 150 receiving upstream transactions from peripheral bus 25, control logic unit 200 may generate control commands similar to the control commands generated by transceivers 110 and 120. Control logic unit 200 may also send those control commands to tunnel control unit 130, thus allowing upstream commands to be scheduled into I/O tunnel 140. In addition, control logic unit 200 may provide downstream circuitry with signals corresponding to upstream commands which may allow the downstream circuitry to maintain the relative order of downstream response transactions.

Figure 3:
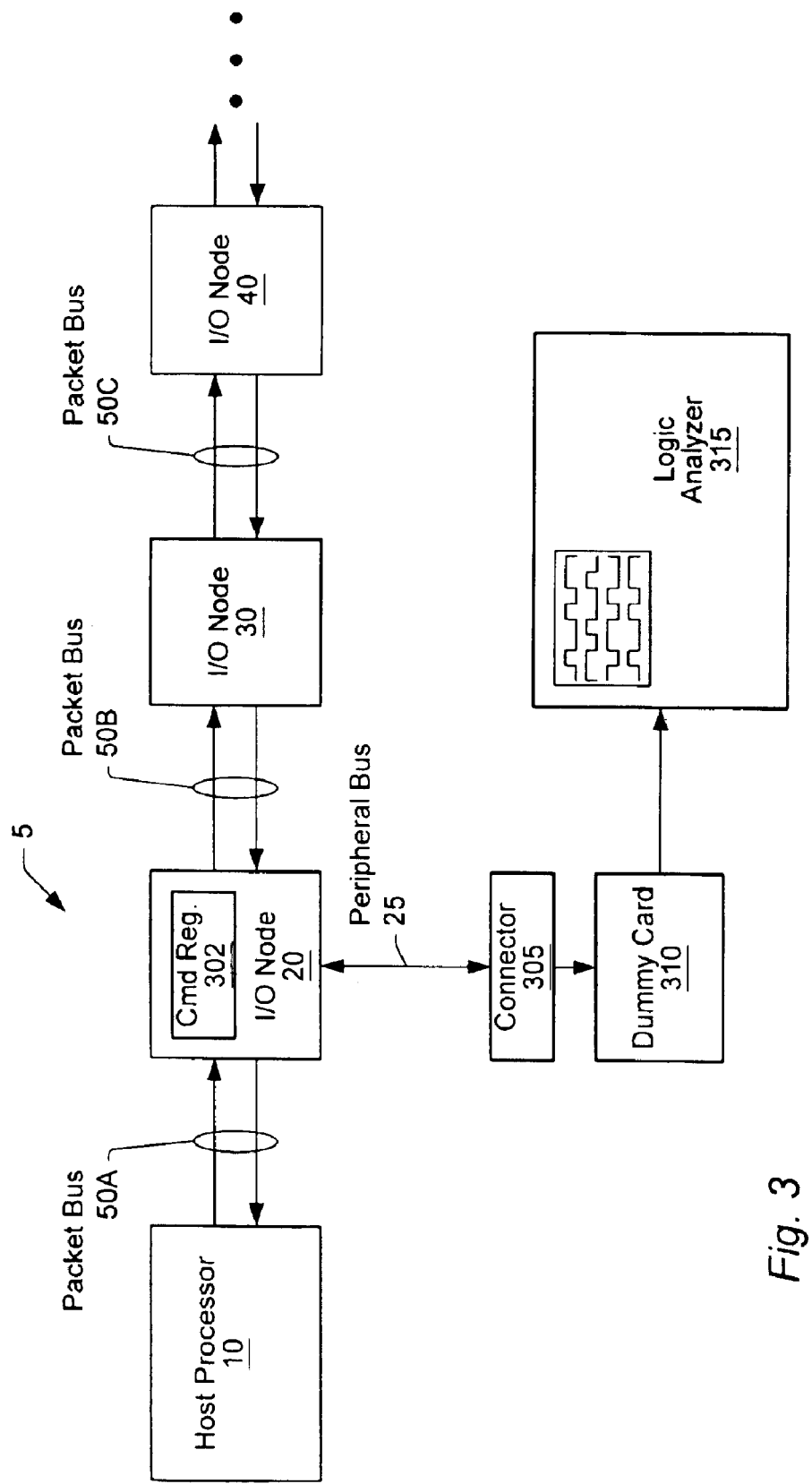
FIG. 3 is a block diagram of one embodiment of a computer system configured to allow the observation with a logic analyzer of packets conveyed on a packet bus.

Moving now to FIG. 3, a block diagram of one embodiment of a computer system configured to allow the observation of packet bus transactions with a logic analyzer is shown. Computer system 5 is similar to the computer system of FIG. 1, and includes host processor 10 and I/O nodes 20, 30, and 40, which are serially coupled to processor 10. I/O nodes 20, 30, and 40 may be similar to I/O node 20 of FIG. 2. Computer system 5 also includes a peripheral bus 25 coupled to I/O node 20. Although not shown here, peripheral buses may also be coupled to I/O nodes 30 and 40. In addition, multiple peripheral buses may be coupled to any of the I/O nodes, which may have multiple peripheral bus interface units. Peripheral bus 25 may include a connector 305 which may allow various types of add-on cards and/or peripheral devices to be coupled to computer system 5. In some embodiments, additional connectors may be present on the peripheral bus.

Dummy card 310 may be configured for insertion into connector 3(15. Dummy card 310 may allow logic analyzer 315 to be coupled to peripheral bus 25, and thus, I/O node 20. Dummy card 310, in the embodiment shown, may be configured to allow the passing of electrical signals present on peripheral bus 25 to logic analyzer 31. In various embodiments, it may be unnecessary for dummy card 310 to include any functional circuitry. Thus, electrical signals appearing on peripheral bus 25 may be allowed to pass to logic analyzer 310 in an unaltered form.

Any or all of I/O nodes 20, 30, or 40 may be configured to operate in a first (normal) mode of operation and a second (analysis) mode of operation. For the purposes of this discussion, reference will be made to I/O node 20, although the discussion may be applicable to any of the I/O nodes shown, or additional I/O nodes (not shown) that may be added to computer system 5. During the normal mode of operation, data transactions may take place within I/O node 20. Transactions in the normal mode may include the transfer of packets from the first packet bus link (packet bus 50A) to the second packet bus link (packet bus 50B), through I/O tunnel 140 (as illustrated in FIG. 2). Normal mode transactions may also include transactions originating or terminating at a device coupled to peripheral bus 25. Transactions in the normal mode that involve peripheral bus 25 may require conversions between a protocol used by the peripheral bus and a protocol used by the packet bus. For example, if peripheral bus 25 is a PCI bus, a transaction in a the normal mode that sends information from host processor 10 to the device on the PCI bus may include converting data and/or commands sent according to the packet bus protocol into a PCI bus protocol. Similarly, transactions originating from a device coupled to peripheral bus 25, using the example of a PCI bus, may require data and/or commands to be converted from the PCI bus protocol to the packet bus protocol. As previously noted, other peripheral bus types (and therefore protocols) are possible and contemplated.

A second mode of operation of 110 node 20 is the analysis mode. Operations in the analysis mode include packets conveyed through the I/O tunnel of I/O node 20 (see FIG. 2) between packet bus link 50A and packet bus link 50B. The packets may be conveyed in either direction, upstream or downstream. The electrical signals of the packets passing through I/O node 20 may be replicated and passed onto one or more signal lines of peripheral bus 25. The packets replicated on the peripheral bus need not be converted to the peripheral bus protocol. During the normal mode of operation, peripheral bus interface 150 of 110 node 20 may perform the required protocol conversions. However, in the analysis mode of operation, protocol conversions need not be performed. Instead, electrical signals present on the packet bus are allowed to pass "as is" through peripheral bus interface 150 onto the peripheral bus. These signals may then pass through connector 305 and dummy card 310 to logic analyzer 315. Thus, electrical signals on the packet bus, normally inaccessible to test equipment, may be observed by test equipment such as logic analyzer 315. In addition to a logic analyzer, other types of signal analyzers may be used also for various testing purposes (e.g. to ascertain an amount of noise present on the packet bus during packet bus transactions).

When I/O node 20 is in analysis mode, it may be virtually invisible to system software and other system hardware. Packets may merely pass through I/O node 20 in analysis mode, while the electrical signals of the packets may be replicated on peripheral bus 25. In addition to replicating the electrical signals on peripheral bus 25, an indication of whether a given packet is being conveyed upstream or downstream may also be provided to peripheral bus 25. In one embodiment, a single bit may be used to indicate whether the transaction is upstream or downstream. The bit may be in a set state to indicate an upstream transaction, and a reset state to indicate a downstream transaction. Other embodiments using different forms of an upstream/downstream indication are possible and contemplated.

Using a logic analyzer or signal analyzer in the configuration shown in FIG. 3, it may be possible to conduct testing and/or to debug problems occurring on the packet bus on any I/O node coupled to the packet bus, and any peripheral buses/devices coupled to the I/O nodes. For example, using the particular configuration shown in FIG. 3, I/O node 20, when in analysis mode, may allow for the monitoring of packet bus transactions between host processor 10 and I/O node 30. Host processor 10 may transmit packets downstream to I/O node 30. As the packets pass through I/O node 20 (which is in analysis mode for this example), the electrical signals of the packet may be replicated onto peripheral bus 25, and thereby monitored by logic analyzer 315. I/O node 30 may transmit information upstream back to host processor 10 responsive to receiving the original transmission. Again, logic analyzer 315 may be used to monitor the packets as they pass through I/O node 20 and corresponding electrical signals are replicated onto peripheral bus 25. If a peripheral device coupled to I/O node 30 is functioning erroneously, monitoring of both the upstream and downstream transactions may yield information pertaining to the problem, and may in some cases even allow a fault to be isolated. Many other uses are possible and contemplated, and the analysis mode for each I/O node may aid debugging for both operational and developmental environments.

I/O node 20 includes command register 302. Command register 302 may be configured to store a plurality of bits, including one or more bits indicating the particular mode that I/O node 20 is operating in. In one embodiment, I/O node 20 may be placed in the analysis mode by latching signals corresponding to the one or more bits into command register 302 during a power-on reset. During the power-on reset, command register 302 may capture and hold the state of the signals that are latched into it, thereby placing it into the analysis mode. The signals may be conveyed one or more lines of the peripheral bus in some embodiments, or may be conveyed through the packet bus in other embodiments. The analysis mode may be exited by performing a second power-on reset without latching the necessary signal states to command register 302. Other methods of entering and exiting the analysis mode are possible and contemplated, and may include use of either the packet bus or the peripheral bus, and may further involve host processor 10.

Figure 4:
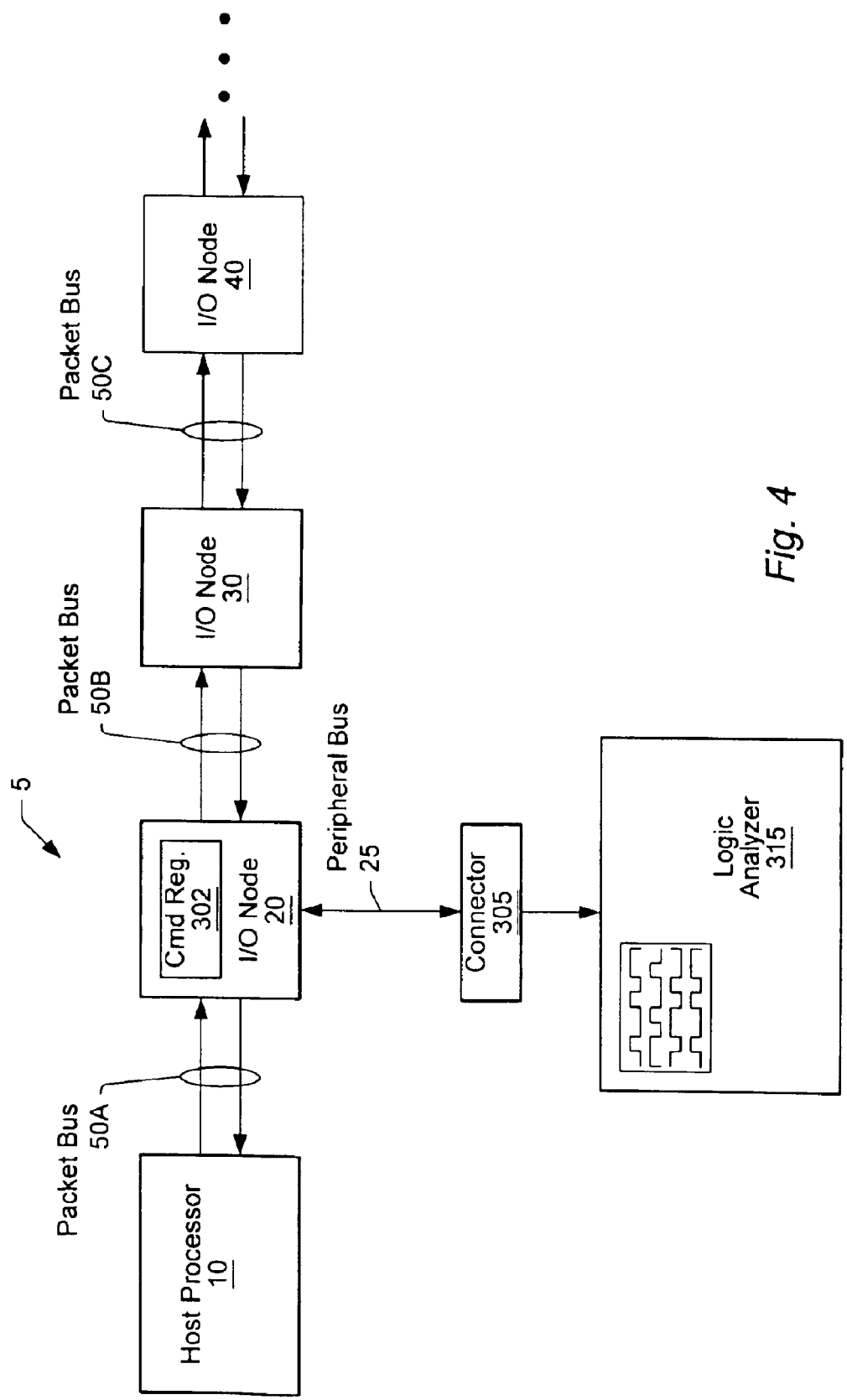
FIG. 4 is a block diagram of another embodiment of a computer system configured to allow the observation with a logic analyzer of packets conveyed on a packet bus.

Moving now to FIG. 4, a block diagram of another embodiment of a computer system configured to allow the observation of electrical signals corresponding to packets conveyed on the packet bus. In the embodiment shown, logic analyzer 315 is directly coupled to connector 305, with no dummy card (such as dummy card 310 of FIG. 3) present. In this embodiment, computer-based instrumentation may be employed, as logic analyzer 315 may be a logic analyzer card. Such a logic analyzer card (or signal analyzer card) may be coupled to a monitor or another computer system in order to display the logic states of the transactions occurring on the packet bus. This may eliminate the need for a dummy card and/or a traditional logic/signal analyzer.

Figure 5A:
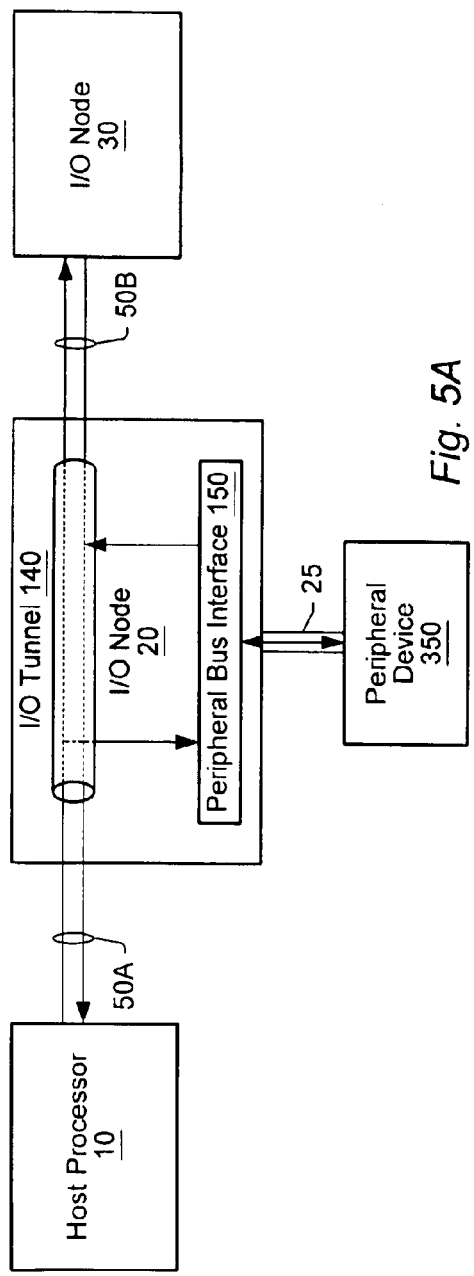
FIG. 5A is a block diagram of one embodiment of a computer system, the diagram illustrating the operations of an I/O node in a normal mode.
Figure 5B:
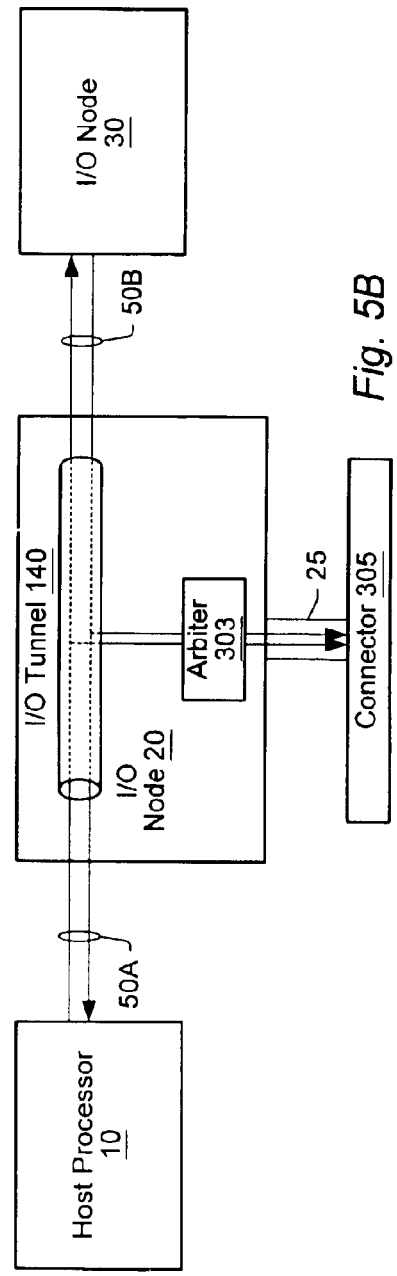
FIG. 5B is a block diagram of the embodiment shown in FIG. 5A, the diagram illustrating the operations of an I/O node in an analysis mode.

FIGS. 5A and 5B illustrate the difference between normal mode and analysis mode for one embodiment of an I/O node. Turning now to FIG. 5A, a block diagram of a computer system is shown in order to illustrate packet bus transactions in a normal mode of operation. In the embodiment shown, packets conveyed from host processor 10 to I/O node 30 may pass through I/O tunnel 140 of I/O node 20. Similarly, packets conveyed from I/O node 30 also pass through I/O tunnel 140 of I/O node 20. Packet transmissions from host processor 10 to peripheral device 350 enter I/O tunnel 140 and are then conveyed to peripheral bus interface 150. A protocol conversion from the packet bus protocol to the peripheral bus protocol may be performed by peripheral bus interface 150. Following conversion to the peripheral bus protocol, peripheral bus interface 150 may generate peripheral bus cycles in order to convey any data and/or commands present in the original packet to peripheral device 350. Similarly, a transmission from peripheral device 350 to host processor 10 begins with a transmission by the peripheral device onto peripheral bus 25. Peripheral bus interface 150 may receive the transmission, and perform a conversion from the peripheral bus protocol to the packet bus protocol. A packet transmission to host processor 10 may then be completed, as the packet(s) may be conveyed to I/O tunnel 140 and on to host processor 10 via packet bus link 50A.

The analysis mode is illustrated in FIG. 5B. In the embodiment shown, packets conveyed from host processor 10 to I/O node 30, or vice versa are also allowed to pass through tunnel 140 of I/O node 20. Additionally, the electrical signals of the packets may be replicated and conveyed onto peripheral bus 25. In some embodiments, the transmissions may completely bypass peripheral bus interface 150 (not shown in FIG. 5B), while in other embodiments, peripheral bus interface 150 may allow the electrical signals to pass through unaltered. In either case, no conversion to the protocol of peripheral bus 25 is required. Thus, by allowing the electrical signals of packet bus transactions to pass to peripheral bus 25 without any protocol conversion, upstream and downstream packet bus transactions may be observed by a logic and/or signal analyzer as shown in FIGS. 3 and/or 4.

I/O node 20 may be configured to provide an indication of whether a particular packet is conveyed upstream or downstream. Thus, when using a signal or logic analyzer to observe electrical signals corresponding to the particular packet, it may be determined whether the particular packet is being conveyed upstream or downstream. In one embodiment, the indication may be in the form of electrical signals conveyed on one or more lines of peripheral bus 25. In embodiments wherein separate processors are coupled to each end of a chain of I/O nodes, the indication may also designate to which processor the direction of packet flow is relative to. The ability to determine the direction in which particular packets are being conveyed may aid in debugging problems pertaining to devices for which the packet bus is used as a communications path (e.g. a peripheral device coupled to an I/O node, wherein the peripheral device may communicate with the host processor).

In some embodiments, the bandwidth of the packet bus may exceed the bandwidth of the peripheral bus. In such embodiments, I/O node 20 may include an arbitration unit, such as arbiter 303 shown here. When two or more packets pass through the tunnel simultaneously during analysis mode, there may be a conflict as to which packet will have its electrical signals replicated on the peripheral bus. In cases where conflicting packets are present, arbiter 303 may be configured to determine which packet has priority. By determining the priority of the packets, arbiter 303 may determine the order in which electrical signals from each of the packets is to appear on the peripheral bus. Thus, the presence of arbiter 303 may ensure that electrical signals for all packets are eventually replicated on the bus, regardless of the bandwidth of the peripheral bus relative to the bandwidth of the packet bus. It should also be noted that arbiter 303 may, in the normal mode, determine the ordering for which peripheral bus cycles corresponding to particular packets are generated, wherein the particular packets are received by the peripheral bus interface.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A computer system comprising:
   a processor;
   a plurality of input/output (I/O) nodes serially coupled to the processor through a plurality of packet bus links, wherein each of the plurality of I/O nodes includes an upstream packet bus interface, a downstream packet bus interface, a peripheral bus interface, and an I/O tunnel; and
   a peripheral bus coupled to the peripheral bus interface of one of the plurality of I/O nodes;
   wherein the one of the plurality of I/O nodes is configured, in a first mode, to selectively convey packets through the I/O tunnel between the upstream packet bus interface and the downstream packet bus interface and to selectively convey particular packets from the upstream packet bus interface to the peripheral bus interface, and in a second mode, to replicate electrical signals corresponding to packets passing through the I/O tunnel on the peripheral bus.

2. The computer system as recited in claim 1, wherein in the first mode, the computer system is configured to generate cycles on a peripheral bus in response to the particular packets being selectively conveyed from the upstream packet bus interface to the peripheral bus interface.

3. The computer system as recited in claim 1, wherein the peripheral bus includes a peripheral bus connector.

4. The computer system as recited in claim 1, wherein the computer system is configured for performing upstream packet transactions and downstream packet transactions, wherein downstream packet transactions originate at the processor, and wherein upstream packet transactions terminate at the processor.

5. The computer system as recited in claim 1, wherein in the I/O node includes an arbitration unit, wherein, in the second mode, the arbitration unit is configured to determine the order in which electrical signals from a first packet will be replicated relative to electrical signals from a second packet.

6. The computer system as recited 1, wherein the I/O node includes a command register, wherein the command register is configured to store one or more bits indicative of whether the I/O node is operating in the first mode or the second mode.

7. The computer system as recited in claim 1, wherein the peripheral bus is a peripheral component interconnect (PCI) bus.

8. The computer system as recited in claim 1, wherein the peripheral bus is an advanced graphics port (AGP) bus.

9. The computer system as recited in claim 1, wherein the peripheral bus is a general-purpose instrument bus (GPIB).

10. The computer system as recited in claim 1, wherein the electrical signals are replicated onto one or more signal lines of the peripheral bus.

11. The computer system as recited in claim 1, wherein the peripheral bus interface is configured, in the first mode, to convey packets into the I/O tunnel.

12. The computer system as recited in claim 3 further comprising a dummy card, wherein the dummy card is configured to be inserted into the peripheral bus connector, and wherein the dummy card is further configured to be coupled to a signal analyzer.

13. The computer system as recited in claim 4, wherein the I/O node is further configured to, in the second mode, to provide an indication of whether a given packet for which electrical signals are replicated is being conveyed upstream or downstream.

14. The computer system as recited in claim 6, wherein the I/O node is configured to enter the second mode responsive to inputting one or more signals corresponding to the one or more bits into the command register.

15. The computer system as recited in claim 12, wherein the signal analyzer is a logic analyzer.

16. The computer system as recited in claim 3, further comprising a signal analyzer card, wherein the signal analyzer card is configured to be inserted into the peripheral bus connector.

17. The computer system as recited in claimed, therein said inputting is performed during a power-on reset.

18. An input/output (I/O) node comprising:
  an upstream packet bus interface and a downstream packet bus interface;
  a peripheral bus interface configured to be coupled to a peripheral bus; and
  an I/O tunnel;
  wherein the I/O node is configured, in a first mode, to selectively convey packets through the I/O tunnel between the upstream packet bus interface and the downstream packet bus interface and to selectively convey particular packets from the upstream packet bus interface to the peripheral bus interface, and in a second mode, to replicate electrical signals corresponding to packets passing through the I/O tunnel on the peripheral bus.

19. The I/O node as recited in claim 18, wherein the peripheral interface unit is configured to generate cycles on the peripheral bus in response to the particular packets being selectively conveyed from the upstream packet bus interface to the peripheral bus interface.

20. The I/O node as recited in claim 18, wherein the upstream packet bus interface and the downstream packet bus interface are each configured to be coupled to a packet bus link.

21. The I/O node as recited in claim 18, wherein the I/O node includes an arbitration unit, wherein, in the second mode, the arbitration unit is configured to determine the order in which electrical signals from a first packet will be replicated relative to electrical signals from a second packet.

22. The I/O node as recited in claim 18, wherein the I/O node includes a command register, wherein the command register is configured to store one or more bits indicative of whether the I/O node is operating in the first mode or the second mode.

23. The I/O node as recited in claim 18, wherein the peripheral bus interface is configured, in the first mode, to convey packets into the I/O tunnel.

24. The I/O node as recited in claim 20, wherein the I/O node is configured to perform upstream packet transactions and downstream packet transactions.

25. The I/O node as recited in claim 22, wherein the I/O node is configured to enter the second mode responsive to inputting one or more signals corresponding to the one or more bits in the command register.

26. The I/O node as recited in claim 24, wherein the I/O node is further configured to provide an indication as to whether a given packet is being conveyed upstream or downstream.

27. The I/O node as recited in claim 25, wherein said inputting is performed during a power on reset.

28. A method for observing transactions on a packet bus in a computer system, the method comprising:
  operating an input/output (I/O) node in an analysis mode, wherein the I/O node includes:
    an upstream packet bus interface and a downstream packet bus interface;
    a peripheral bus interface configured to be coupled to a peripheral bus; and
    an I/O tunnel;
    wherein the I/O node is configured, in a normal mode, to selectively convey packets through the I/O tunnel between the upstream packet bus interface and the downstream packet bus interface and to selectively convey particular packets from the upstream packet bus interface to the peripheral bus interface, and in the analysis mode, to replicate electrical signals corresponding to packets passing through the I/O tunnel on the peripheral bus;
  coupling a signal analyzer to a peripheral bus, wherein the peripheral bus is coupled to the peripheral bus interface; and
  observing the electrical signals replicated on the peripheral bus.

29. The method as recited in claim 28, wherein, in the normal mode, the computer system is configured to generate cycles on a peripheral bus in response to the particular packets being selectively conveyed from the upstream packet bus interface to the peripheral bus interface.

30. The method as recited in claim 28, wherein the peripheral bus includes a peripheral bus connector.

31. The method as recited in claim 28, wherein the computer system includes a processor, and a plurality of I/O nodes serially coupled to the processor.

32. The method as recited in claim 28, wherein the I/O node includes a command register, wherein the command register is configured to store one or more bits indicative of whether the I/O node is operating in the normal mode or the analysis mode.

33. The method as recited in claim 28 further comprising replicating the signals onto one or more signal lines of the peripheral bus.

34. The method as recited in claim 28, wherein the I/O node includes an arbitration unit, wherein, in the analysis mode, the arbitration unit is configured to determine the order in which electrical signals from a first packet will be replicated relative to electrical signals from a second packet.

35. The method as recited in claim 28, wherein the peripheral bus is a peripheral component interconnect (PCI) bus.

36. The method as recited in claim 28, wherein the peripheral bus is an advanced graphics port (AGP) bus.

37. The method as recited in claim 28, wherein the peripheral bus is a general purpose instrument bus (GPIB).

38. The method as recited in claim 28, wherein the wherein the peripheral bus interface is configured, in the first mode, to convey packets into the I/O tunnel.

39. The method as recited in claim 30, wherein a dummy card is coupled to the peripheral bus connector.

40. The method as recited in claim 30, wherein a signal analyzer card is coupled to the peripheral bus connector.

41. The method as recited in claim 31, wherein the computer system is configured for upstream transactions and downstream transactions, wherein downstream transactions originate at the processor, and wherein upstream transactions terminate at the processor.

42. The method as recited in claim 32, wherein the I/O node is configured to enter the analysis mode responsive to inputting one or more signals corresponding to the one or more bits into the command register.

43. The method as recited in claim 39, wherein the signal analyzer is coupled the dummy card.

44. The method as recited in claim 40, wherein the signal analyzer card is a logic analyzer card.

45. The method as recited in claim 41 further comprising providing an indication of whether the electrical signals correspond to packets conveyed in an upstream transaction or a downstream transaction.

46. The method as recited in claim 43, wherein the signal analyzer is a logic analyzer.

47. The method as recited in claim 42, wherein said inputting is performed during a power on reset.

* * * * *

UNITED STATES PATENT AND TRADEMARK OFFICE
CERTIFICATE OF CORRECTION

PATENT NO. : 6,862,647 B2
DATED : March 1, 2005
INVENTOR(S) : Larry D. Hewitt

It is certified that error appears in the above-identified patent and that said Letters Patent is hereby corrected as shown below:

Column 13,
Line 58, please change "claimed, therein" to -- claim 11, wherein --.

Signed and Sealed this

Seventh Day of June, 2005

JON W. DUDAS
*Director of the United States Patent and Trademark Office*